United States Patent
Kokemohr

(10) Patent No.: US 10,535,123 B2
(45) Date of Patent: *Jan. 14, 2020

(54) METHOD FOR SLICED INPAINTING

(71) Applicant: Google LLC, Mountain View, CA (US)

(72) Inventor: Nils Kokemohr, Hamburg (DE)

(73) Assignee: Google LLC, Mountain View, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/842,804

(22) Filed: Dec. 14, 2017

(65) Prior Publication Data

US 2018/0108119 A1    Apr. 19, 2018

Related U.S. Application Data

(63) Continuation of application No. 15/260,390, filed on Sep. 9, 2016, now Pat. No. 9,870,604, which is a
(Continued)

(51) Int. Cl.
*G06T 5/00* (2006.01)
*G06T 5/20* (2006.01)
(Continued)

(52) U.S. Cl.
CPC .............. *G06T 5/005* (2013.01); *G06T 5/001* (2013.01); *G06T 5/006* (2013.01); *G06T 5/20* (2013.01);
(Continued)

(58) Field of Classification Search
CPC .................. G06T 11/001; G06T 5/005; G06T 2207/20104
See application file for complete search history.

(56) References Cited

U.S. PATENT DOCUMENTS 4,490,744 A    1/1984   Levine
5,157,424 A    10/1992  Craven et al.
(Continued)

FOREIGN PATENT DOCUMENTS

EP    0886437     12/1998
JP    7-162677    6/1995
(Continued)

OTHER PUBLICATIONS

USPTO, Final Office Action for U.S. Appl. No. 11/946,005, dated Apr. 13, 2012, 9 pages.
(Continued)

*Primary Examiner* — Ruiping Li
(74) *Attorney, Agent, or Firm* — IP Spring

(57) ABSTRACT

A method for replacing image data in a destination region that is divided into sub-pieces along one or more cutting paths, which start and end at two different points on the border, and finding replacement data for the sub-pieces. The cutting paths may be determined as a function of the type of image structured at the start and the end points. The cutting paths may also be determined as a function of the area of the sub-pieces and the lengths of the cutting paths. Optionally, the destination region may be determined by a spot detection algorithm. Further optionally, the spot detection algorithm may comprise calculation of a high pass filter, or detection of areas of luminosity and border-to-volume ratios. A method for moving an image element within an image is also provided.

20 Claims, 3 Drawing Sheets

Related U.S. Application Data continuation of application No. 14/720,601, filed on May 22, 2015, now Pat. No. 9,443,285, which is a continuation of application No. 11/946,005, filed on Nov. 27, 2007, now Pat. No. 9,053,530.

(60) Provisional application No. 60/867,373, filed on Nov. 27, 2006.

(51) Int. Cl.
*G06T 7/13* (2017.01)
*G06T 7/90* (2017.01)

(52) U.S. Cl.
CPC .............. *G06T 7/13* (2017.01); *G06T 7/90* (2017.01); *G06T 2207/10024* (2013.01); *G06T 2207/20021* (2013.01); *G06T 2207/20192* (2013.01)

(56) References Cited

U.S. PATENT DOCUMENTS

| | | | |
|---|---|---|---|
| 5,544,239 | A | 8/1996 | Golin et al. |
| 5,638,496 | A | 6/1997 | Sato |
| 5,661,521 | A | 8/1997 | Curtis et al. |
| 6,313,883 | B1 | 11/2001 | Thaler et al. |
| 6,535,301 | B1 | 3/2003 | Kuwata et al. |
| 6,807,288 | B2 | 10/2004 | Inagaki |
| 6,829,393 | B2 | 12/2004 | Jansson |
| 7,327,374 | B2 | 2/2008 | Oh et al. |
| 7,444,656 | B2 | 10/2008 | Lemmons |
| 7,483,551 | B2 | 1/2009 | Chen |
| 7,545,408 | B2 | 6/2009 | Nomura et al. |
| 7,558,433 | B1 | 7/2009 | Georgiev |
| 7,729,510 | B2 | 6/2010 | Zakrzewski et al. |
| 7,756,343 | B2 | 7/2010 | Li et al. |
| 8,103,105 | B2 | 1/2012 | Kuroda et al. |
| 2003/0090597 | A1* | 5/2003 | Katoh ................ H04N 9/3111 348/744 |
| 2003/0099406 | A1 | 5/2003 | Georgiev |
| 2003/0210828 | A1 | 11/2003 | Georgiev et al. |
| 2004/0031036 | A1 | 2/2004 | Dinges et al. |
| 2005/0168482 | A1 | 8/2005 | Criminisi et al. |
| 2006/0269111 | A1* | 11/2006 | Stoecker ............... G06F 19/321 382/128 |
| 2007/0071347 | A1 | 3/2007 | Li et al. |
| 2008/0187198 | A1 | 8/2008 | Grady et al. |
| 2009/0016609 | A1 | 1/2009 | Zakrzewski et al. |
| 2009/0226092 | A1 | 9/2009 | Kuroda et al. |

FOREIGN PATENT DOCUMENTS

| | | |
|---|---|---|
| JP | 10-091761 | 4/1998 |
| JP | 11-146219 | 5/1999 |
| JP | 2000-151985 | 5/2000 |
| JP | 2001-67469 | 3/2001 |

OTHER PUBLICATIONS

USPTO, Notice of Allowance for U.S. Appl. No. 11/946,005, dated Feb. 6, 2015, 20 pages.
USPTO, Non-Final Office Action for U.S. Appl. No. 11/946,005, dated Jan. 21, 2014, 22 pages.
USPTO, Final Office Action for U.S. Appl. No. 11/946,005, dated Jun. 13, 2014, 13 pages.
USPTO, Non-Final Office Action for U.S. Appl. No. 11/946,005, dated May 20, 2013, 9 pages.
KIPO, International Search Report and Written Opinion for International Patent Application No. PCT/2007/085672, dated May 28, 2008, 7 pages.
USPTO, Non-Final Office Action for U.S. Appl. No. 11/946,005, dated Oct. 21, 2011, 8 pages.
USPTO, Final Office Action for U.S. Appl. No. 11/946,005, dated Sep. 12, 2013, 9 pages.
Date, et al., "Sentakuhanni-hen", Mac Fan Special 14, Mainichi Communications, Japan, Feb. 22, 2001, pp. 51-70.
International Bureau of WIPO, International Preliminary Report on Patentability for International Patent Application No. PCT/US2007/085672, dated Jun. 3, 2009, 5 pages.
USPTO, Notice of Allowance for U.S. Appl. No. 14/720,601, dated May 13, 2016, 11 pages.
USPTO, Non-final Office Action for U.S. Appl. No. 15/260,390, dated Jul. 3, 2017, 13 pages.
USPTO, Notice of Allowance for U.S. Appl. No. 15/260,390, dated Oct. 18, 2017, 7 pages.

* cited by examiner

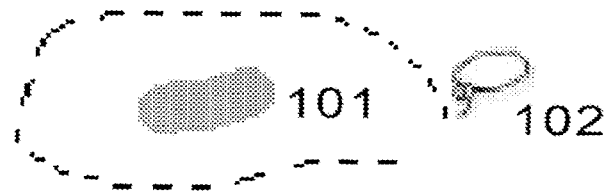
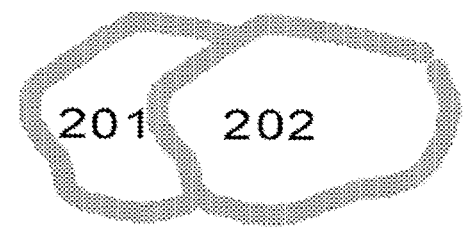
Fig. 1A    Fig. 1B
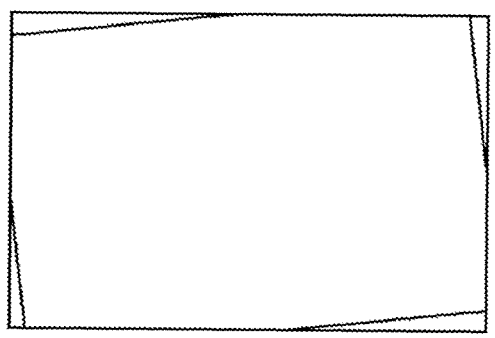
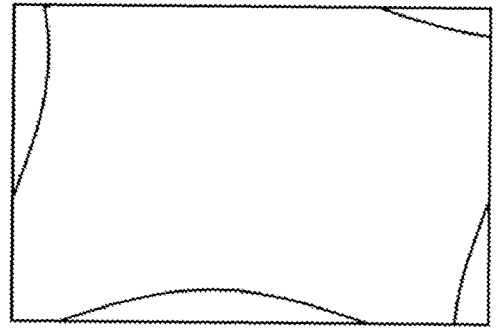
Fig. 1C
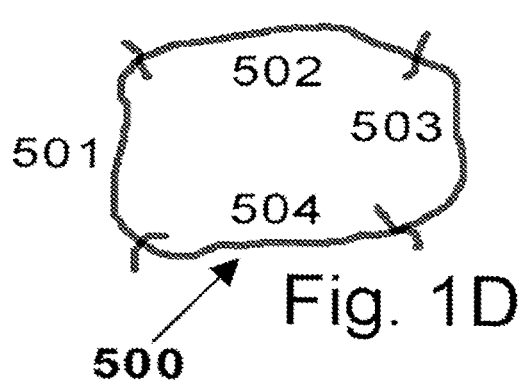
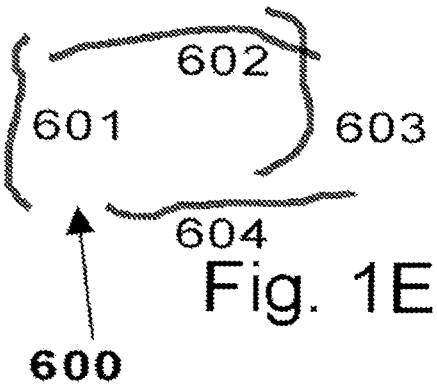
Fig. 1D    Fig. 1E

METHOD FOR SLICED INPAINTING

CROSS REFERENCE TO RELATED APPLICATION

The present application is a continuation of U.S. patent application Ser. No. 15/260,390, filed Sep. 9, 2016 and titled METHOD FOR SLICING INPAINTING, which is a continuation of U.S. patent application Ser. No. 14/720,601, filed May 22, 2015 and titled METHOD FOR SLICED INPAINTING (now U.S. Pat. No. 9,443,285), which is a continuation of U.S. patent application Ser. No. 11/946,005, filed Nov. 27, 2007 and titled METHOD FOR SLICED INPAINTING (now U.S. Pat. No. 9,053,530), which claims the benefit of U.S. Provisional Patent Application No. 60/867,373, filed Nov. 27, 2006 and titled Method for Sliced Inpainting, the content of all of which are incorporated by reference in this disclosure in their entirety.

BACKGROUND

Inpainting repairs defective, unwanted or missing image areas by replacing them with a suitable, adapted piece found elsewhere in the image, preferably without visible artifacts.

Many papers and patents have been published on inpainting. Inpainting typically covers the problem of replacing annoying, unwanted or missing image data with new pixels. Some suggestions have been made to repair the image area with repeated use of convolution kernels, while some suggest or implement the use of replacement pixels or replacement structure.

Routines work well only when the user provides a suggestion to the algorithm as to which image area might make a good candidate for replacing the area to be inpainted. Routines that try to find replacement data automatically do not work well once the replacement area is large (larger than 1% of the image). What is needed is a system that does a better job in finding replacement areas, and that can assemble replacement image data comprised of multiple smaller areas if the area to be inpainted is very large.

SUMMARY

The invention meets this need by providing a method for replacing image data in a destination region having a border, comprising dividing the destination region into sub-pieces along one or more cutting paths, the cutting paths starting and ending at two different points on the border of the destination region; and finding replacement data for the sub-pieces.

The cutting paths may be determined as a function of the type of image structured at the start and the end point of the cutting path. In another embodiment, the cutting paths are determined as a function of the area of the sub-pieces and the lengths of the cutting paths.

The destination region may be the product of a rotation, a perspective correction, a lens distortion correction, or a creative image distortion. Optionally, the destination region may be determined by a spot detection algorithm. Optionally, the spot detection algorithm may comprise calculation of a high pass filter, or detection of areas of luminosity and border-to-volume ratios.

Also provided is a method for moving an image element within an image, comprising receiving the boundary of a source region comprising the image element; receiving a destination region within the image; copying image data from the source region to the destination region; determining a residual region, comprising area of the source region that does not intersect with the destination region; and applying an inpainting routine to the residual region.

Optionally, before the applying step, the residual region may be divided into sub-pieces. The copying step may comprise an adaption method based upon differences between pixel values of the margin of the source region and the margin of the destination region.

BRIEF DESCRIPTIONS OF THE DRAWINGS

FIG. 1 shows various aspects of the invention disclosed. FIG. 1A depicts how a user can provide a region of interest to the system/application to indicate an image imperfection that needs to be removed. FIG. 1B depicts in simplified form a selected part of the image that was moved by the user. FIG. 1C show rotated or distorted images which no longer fill out the full rectangular shape of the image. FIG. 1D shows how a margin can be split up into four sections. FIG. 1E shows the sections of FIG. 1D with a slight offset per section.

FIG. 2A depicts a sub-optimal copying of a replacement structure into a destination area, and FIG. 2B depicts an enhanced copying using a slight distortion.

FIG. 3 demonstrates how a large object may be removed using an embodiment of the slicing aspect of the invention. FIG. 3A shows a large object that needs to be removed. FIG. 3B shows an object reduction using one whole, un-sliced replacement piece of a different area in the image, and FIG. 3C shows how good results can be obtained if the replacement structure is assembled of multiple smaller regions.

FIG. 5 shows a process for slicing regions to be inpainted according to an embodiment of the invention.

DETAILED DESCRIPTION

Figure 2A:
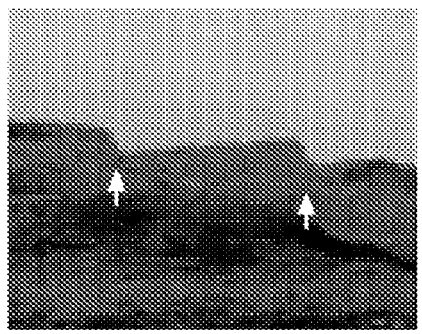

We inpaint an image area by the following routine:
Algorithm 01
1—receive pixels of area to be inpainted (area D)
2—find an area that has suitable structure (area S) to replace area D
3—copy pixels of area S into area D
4—adapt the new pixels in area D so that they fit seamlessly While the routine for step 3 is trivial, 1, 2 and 4 are not. Therefore the routines in step 1, 2 and 4 are described below in detail; Step 1: "Finding Area D"; Step 2: "Finding Area S"; and Step 4: "Adaption".

Step 1: Finding Area D

Finding Area D (the area to be inpainted) is not discussed much in the literature since it is generally assumed that the user circles or otherwise identifies the unwanted area. In this disclosure we suggest some other methods to obtain an area D.

Note that when the plural "we" is used in this disclosure it is not meant to imply that there are multiple inventors. It is solely used as a grammatical device for explication.

Finding Area D—Method 1: User Defined

This approach is trivial: allow the user to brush, paint, circle or otherwise determine an image area. One of ordinary skill with reference to this disclosure will know how to allow a user to point out a region of interest. FIG. 1A shows how a user can circle an unwanted area 101 in a digital image with a pointing device 102. The pixels within the area are then considered pixels within area D.

Finding Area D—Method 2: Automatic Dust and Blemish Detection

This method is suitable to identify dust, skin blemishes and other similar details that the user typically wants to remove. It can be done by the following spot-detection-algorithm:

Algorithm 02
1—create a highpass of the image I and store it in H
2—Create H' so that H'=0 if H<n and H'=1 else.
3—Find an area which isn't yet inpainted of 20 to 600 connected 1's in H' that has a low border-pixel-to-total-pixel-count. END if no such area can be found.
4—apply Algorithm 01 to the found area, the found area being D.
5—go to step 3.

We suggest that the highpass used in step 1 utilize a radius of about 0.05% to 1.5% of the image diameter and produces a result the mean of which is 128.

The variable n in step 2 can be any number lower than 128, for instance 125. The lower the number, the stronger and contrastier the blemishes need to be to be detected. Note that the algorithm assumes that unwanted objects are darker that the surrounding image, which is typically the case.

In step 3, the range 20 to 600 can of course be adapted to the image size and to the imperfections to be removed. For instance, it may be adjusted to the type of dust that may occur on the sensor. For instance, some SLR cameras may have larger dust than other cameras based on the physics of the camera. Sufficient literature has been written on how to detect whether an area of connected 1's is prolonged, compact or circular, particularly based upon calculations on border-pixel-to-total-pixel ratio respectively outline to volume ratio. The optimal theoretical border-pixel-to-total-pixel ratio of an image is $4\alpha/\alpha^2$, which will due to noise not be reached, so $10\alpha/\alpha^2$ is a good value to start with for a low border-pixel-to-total-pixel-count.

Finding Area D—Method 3: Undefined Areas Due to Moved Selections

This is a rather helpful technique for users dealing with image retouching. FIG. 1B depicts a selected bitmap area 202 containing an image element that the user has moved to the right, leaving pixels in bitmap area 201 behind that are no longer defined. Some image editing applications leave white pixels or transparent pixels (holes) behind, others leave the original pixels behind. In any case, unwanted artifacts can occur. For instance, if the selected bitmap area 202 enclosed a ball, the bitmap area 201 may now show half a ball after the moving of the bitmap portion (in those instances in which original pixels are let behind) or a "hole" (in those instances in which original pixels are replaced with some default value).

However, if the bitmap area 201 is defined as area D and algorithm 01 is applied, said bitmap area 202 can be moved around in the image, leaving no artifacts or holes in bitmap area 201. Using this method, an image element can be moved within an image by receiving the boundary of a source region comprising the image element, receiving a destination region within the image, copying image data from the source region to the destination region, determining a residual region, comprising area of the source region that does not intersect with the destination region, and applying an inpainting routine to the residual region.

Finding Area D—Method 4: Undefined Areas Due to Image Distortion

When images are distorted (rotated, corrected for perspective, or corrected for lens defects such as barrel or pincushion distortion) they typically no longer have a shape that matches a straight rectangle that is parallel to the x and y axes. Therefore significant parts of the distorted image need to be cut away to obtain a rectangular image again, or undefined (white) pixels need to be included in the result. FIG. 1C show such a result. Rotated image 300 shows the result of a rotation. Distorted image 400 shows the result of a more complex distortion, for instance a lens correction with a connected perspective correction. The small enclosed areas along the border show the areas that would no longer be defined.

Now, if all pixels along the margin of the resulting image 300 or image 400 are filled up with the closest pixel that carries actual values, said undefined areas are surrounded by a margin of now defined pixels. If successively those areas (typically 4 areas) are defined as area D and fed into Algorithm 01, and the four results are combined to one image, a distorted image of acceptable size without missing or undefined pixels can be obtained. How to combine the four results into one image is evident to those skilled in the art; during the merging defined pixels need to overwrite the undefined pixels.

FIG. 4 show such a progress. FIG. 4A shows a rotated image with four "empty" corners. FIG. 4B shows how margin pixels were filled in on the upper left corner to form a closed area C. FIG. 4C shows how that destination area C was split up (see below) into two closed areas D1 and D2, using a linear interpolation of pixel values along the cutting path/cutting vector. FIG. 4D shows the final inpainted result for the upper left corner.

Finding Area S

Algorithm 01 contains a step that requests finding an area S that contains a structure suitable to be inserted at the location of the area D. ("S" stands for source and "D" for destination of the copy process.) Imagine that D contains some foliage on the ground, or patterned tiles on a wall, or fine twigs against a sky. In that case that the fine details along the margin of S and D should be as similar as possible. This Algorithm 03, which parses the details of the margin at a fine resolution, optimally on a pixel level, may be used to find S:

Algorithm 03
1—detect the pixels at δD, being the margin of D.
2—make a guess for a candidate for S and detect its margin pixels, being δS.
3—since δD and δS are vectors of many RGB vectors, measure the quality of match by the Euclidean distance between the vectors δD and δS.
4—unless a high number (about 10,000) of candidates were tested, go to 2
5—define S as the candidate with the best measured quality.

This algorithm leads to surprisingly good results, since a very detailed comparison of the margin is performed. If higher speed is desired (the algorithm isn't slow, though), a rougher scale can also be used, but we recommend not to downscale the image by more than a factor of 5.

Other distance measures could be tried. For example, the algorithm can be enhanced by combining the measure for the quality of a candidate for S by measuring both the Euclidean vector distance and the angle between the vectors, which makes the measure for the quality less dependent on absolute brightness. Note that angle here refers to the angle between two vectors in a space of several hundred dimensions, depending on the border length of δD and δS.

Also, the algorithm can be enhanced by applying Algorithm 03 on a highpass version of the image, ensuring that absolute colors and soft color gradients are disregarded in the measuring of the quality. Step 4 of Algorithm 01 will correct for absolute color differences and low frequency mismatches. A further enhancement is to apply the algorithm of a weighted mix of the original image and its highpass.

The algorithm can be even more enhanced by not applying it on RGB values but on either Lab values (id est 3 channels), or even more channels such as luminance, entropy, median of luminance, high pass of luminance, high pass of chroma a, or high pass of chroma b. This ensures even more that replacement areas are found that have not only small vector difference in details along the margin, but also a comparable structure, to avoid, for instance, foliage being replaced with tapestry, or grass being replaced with clouds.

Note that step 2 of Algorithm 03, "make a guess for a candidate for S", refers to defining an area of the same size as D within the same image or a different image. This can be done by using a random position, or by successively moving it along a virtual and more or less coarse raster. If different images are taken into consideration, the algorithm may focus on comparable images on the hard drive with similar EXIF data, for instance images with comparable ISO setting. Alternatively, consider that the user has used a "remove skin blemish" tool or a "remove object from wall" tool, etc., then S can also be searched in a database of images containing such structure.

Enhancement to Finding S

FIG. 1D shows the shape of a source margin 500, which is δS. Note that the shape of the source margin 500 and the destination margin δD (not shown) are at this time identical. The curve δS is partitioned into intervals 501, 502, 503, and 504. If δS is provided by a parameterization by its arc length s (which is a convenient representation in the discrete pixel world), for instance so that the trace of δS is given by δS: $[0 \ldots s] \to R^2$, then the four intervals can be defined as

501: [4, s/4]
502: [s/4, s/2]
503: [s/2, 3s/4]
504: [3s/4, s]

having the center points s/8, 3s/8, 5s/8, and 7s/8 respectively. Note that it is irrelevant where the starting point of the parameterization is defined, but it might be slightly beneficial to position one of the center points so that it coincides with a stark contrast change on δD (again, keep in mind that δS and δD have the same shape, so considerations on their parameterizations are interchangeable).

Remember that Algorithm 03 describes that S can be found by overlaying successively the margin δS over the image, measuring the quality of match and defining S as the candidate that was found to have the best match.

The algorithm can be enhanced by—whenever a good match is encountered—additionally moving the four sections of the margin candidate intervals 501, 502, 503, and 504 around by a small maximum spatial distance, so that it is detected whether a slight offset may increase the match on one or more of the four sides. As shown in FIG. 1E, the temporary torn-apart source margin 600 is now called δS*, with intervals 501, 502, 503, and 504 now moved and represented by intervals 601, 602, 603, and 604. What is actually overlaid over the image and tested for a quality of match may look like what is shown in FIG. 1E.

If this leads to a better match, then the four center points at δS*(s/8), δS*(3s/8), δS*(5p/8), δS*(7p/8) (of the torn-apart source margin 600) are stored as variables, the image area around the found candidate is also stored in a separate memory block which is then distorted to match better. The easiest approach is to distort it so that the centers of the shifted curve segments of δS* match the centers of the four components of the undistorted curve δS. Note that a distortion based upon four reference points is clearly defined, for instance known as perspective distortion. We are distorting the entire found area (interior and its margin) to better match the destination area.

Figure 2B:
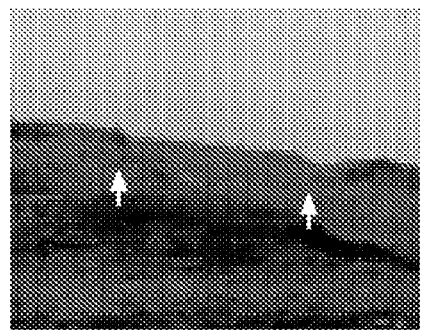

The in such way distorted bitmap and the trace of δS (not δS*) within this bitmap is then the found candidate for S. Out of such candidates, find the optimal one and define it as S. FIG. 2 shows the advantages of such a method: If the margins of a replacement piece don't fit optimally (FIG. 2A, arrows), a slight distortion (FIG. 2B, arrows) can enhance the result.

Bitmap Adaption

The last step of Algorithm 01 is to adjust the brightness of the copied pixels. Imagine that this algorithm—when step 4 is reached—has copied a more or less suitable bitmap from S into D. If this is for instance a piece of tapestry in a shadow that was copied into a bright piece of tapestry, then by the end of step 3 there will be a dark area within the image. This is a rather easy problem, since the pixels are more or less uniformly too dark, but it may get more complicated: If foliage is copied from here to there, the luminosity difference may be much more complicated due to the complex structure.

Bitmap Adaption—3×3 Kernel Adaption

This adaption method is based on the margin differences. Once the pixels have been copied from S into D, the margin difference δM=δD−δS is calculated (δD and δS referring to the original pixels at the margin of the two areas S and D in the original image. The subtraction refers to a pairwise subtraction of pixel values, not an exclusion operator). The difference δM is then a number of border pixels having positive and negative values. We suggest to create a (signed) pixel block M in memory, and to write the values of 8M into this pixel block and then to fill the values in M based upon the border values in δM.

As suggested by Oliveira et al, proceedings of VIIP 2001, "Fast Digital Inpainting", M can be gained from δM by iteratively applying a kernel such as the following to the pixels enclosed by δM, and not modifying the border pixels themselves:

$$[0.073235, \quad 0.176765, \quad 0.073235$$
$$0.176754, \quad 0.0, \quad\quad 0.176765$$
$$0.073235, \quad 0.176765, \quad 0.073235]$$

This method of adaption can also be used if a user manually copies an image element from one location to another, such as in FIG. 1B, where the element 202 may not fit seamlessly into its new location.

Bitmap Adaption—Illumination Adaption

Another approach is to determine the illumination function in the area D and in the area S (before pixels were copied), named ill(D) and ill(S), and—after the copying has taken place—to adjust the illumination of the copied pixels by multiplying them by the factor ill(D)/ill(S). Those skilled in the art will know that pixels can be represented by the product of a surface color and its illumination. Based on this theory, the above mentioned multiplication will bring the copied pixels into the correct light, making them match better.

In all suggested adaption methods, it may facilitate the implementation if the data is first copied from S to S', S' being a region in a separate bitmap in memory, then δM and M are calculated, then the contents of S' is adapted using M, and then the contents of S' is copied into the area D.

Making source pixels fit seamlessly into a destination area by adding a correction matrix M onto it can also be used if a user wants to copy data within an image or across an image. For instance, when bitmap data are moved as shown in FIG. 1B, the bitmap data can be adapted to fit to the new location by defining δM=δD−δS, S being the copy source area and D being the copy destination area, and filling in M using one of the above named adaptions. The advantage of using, for instance, a kernel to iteratively fill M based upon δM is that the algorithm works even if δM is not continuous. This allows for bitmap adaption even if part of δM is not defined, which may occur when a bitmap is copied on an image area that is only partly defined—see the bitmap area 201 for such an undefined area.

Slicing D

The idea slicing D for better results is the idea to "divide and conquer". Concretely, this can look as follows:

Algorithm 04
1—receive large area C
2—divide C into $D_1, D_2 \ldots D_N$, where $D_1 \ldots D_N$ are disjoint and
$D_1 \cup D_1 \ldots \cup D_N = C$
3—apply algorithm 01 on $D_1, D_2 \ldots D_N$ Obviously, the difference is now that the replacement area is a little "patchwork" of multiple bitmaps. The advantage is that Algorithm 01 is more likely to find well-fitting replacement areas when the received area to be inpainted is not too large, and also that the inpainted area C will not contain a large structure identical to a different area in the image, which would be confusing to the viewer.

Figure 5A:
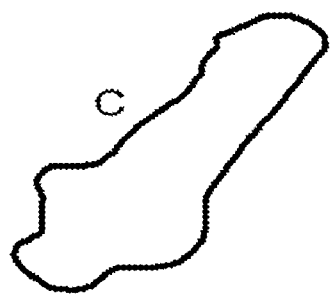
FIG. 5A shows a potential region of interest C.
Figure 5B:
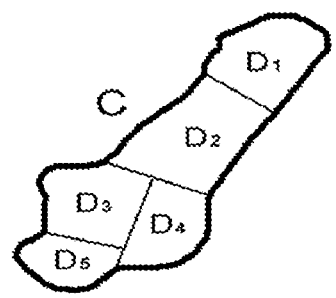
FIG. 5B shows a potential "slicing" of the region C into sub-regions $D_1 \ldots D_5$.

FIG. 5A shows such a large area C. Note that area C is extended (i.e., it is long and narrow), which may be very often the case. This makes the slicing approach even more successful. The routine for slicing C into $D_1 \ldots D_N$, as shown in FIG. 5B, can look as follows:

Algorithm 05
1—receive large area C.
2—find many (10,000) cutting vectors that start at random point of δC and end at a different random point of δC.
3—out of these, sort all out those cross pixels not belonging to C.
4—out of the remaining, sort all out that are too short (<1% of arc length of δC).
5—within the remaining, find the ones where the conditions A1, A2 and A3 (as defined below) are low.

Figure 5C:
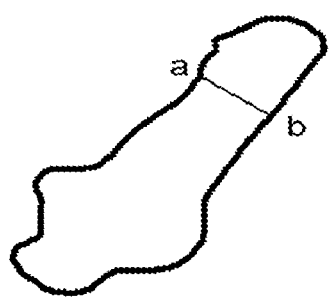
FIG. 5C shows a cutting vector.
Figure 3A:
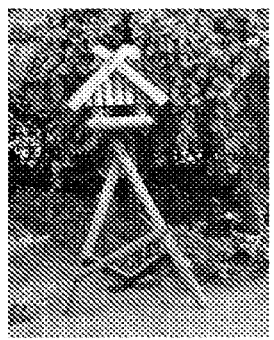
Figure 3B:
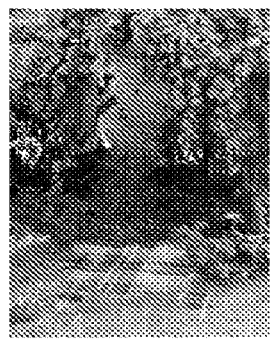
Figure 3C:
Figure 4A:
FIGS. 4A-4D depict an image and inpainting of the upper left corner of that image according to one embodiment of the invention.
Figure 4B:
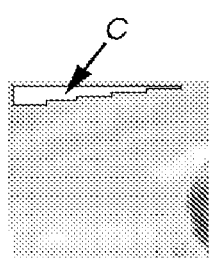
Figure 4C:
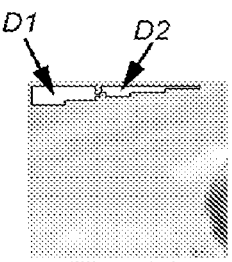
Figure 4D:
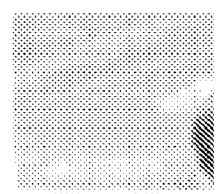

Algorithm 05 is suitable to divide an area C into two sub-areas by identifying a cutting vector. To those skilled in the art of computer science and recursive programming it will be obvious that this can be used to further cut C into more sub-areas until sufficient sub-areas $D_1 \ldots D_N$ are found, as in FIG. 5B. How many areas N are to be found depends on the desired effect and the size of C. A good start for a sub-area amount may be N=int(arc length of δC/250). The conditions A1, A2 and A3 of line 5 of algorithm 05 can be the following:

Condition A1:
If a and b, as shown in FIG. 5C, are the start and end points of a cutting vector, that is to say a and b lie at the intersection points of the cutting vector and δC itself, then condition A1 is the ratio of the arc length of δC from point a to b (take the shortest of the two paths from a to b along δC) to the vector length. For example, if A1 is high, the vector is short and cuts a decent part off of C. However, if A1 is low (close to 1), the area enclosed between the vector and δC cannot be large, which makes the cutting vector not a good candidate.

Condition A2:
The second condition is any means to compare the similarity of pixels within δC around the point a and the point b. For instance, the ten pixels closest to a and the ten pixels closest to b can be compared with regard to the color difference, the chrominance difference, etc. Condition A2 helps finding cutting vectors the ends of which (a and b) lie within similar structure. This should avoid that one end of the vector lies on a foliage structure and the other end lies on a sky structure, leading to a suboptimal cutting vector. A2 can be a number, where 0 represents good similarity (sky-sky) and 10 represents poor similarity (sky-foliage). Multiple methods are known to the skilled in the art for detection of a difference between two sets/vectors of colors.

Condition A3:
The third condition A3 can be a low number if both a and b are remote from an edge within δC, and high if a or b is close to an edge in C. This should ensure that the cutting vector does not cut C in the vicinity of an object edge, where artifacting would be most visible.

If all conditions A1, A2, A3 are low, the current candidate is a good candidate for a cutting vector.

Side-Note: In some cases it may occur that the area C is not continuous to begin with, for instance in cases as depicted in FIG. 1B, if bitmap area 202 was moved only by a short distance and intersects bitmap area 201. If C is not continuous, δC will consist of several closed paths. It is suggested that each of the sub-components of C enclosed by a closed path can be considered a "slice" $D_n$ of C. In other words: If C is divided to begin with, one should use this dividedness as a starting for the "divide and conquer" approach.

Once area C is cut into N sub-areas $D_1 \ldots D_N$, it is easy to use algorithm 04 to replace the data within C with new data. Note that along the cutting vectors, no pixel values may exist, therefore we suggest that the pixel values along the cutting vectors be interpolated between the start and the end point of the cut. This is trivial since this is a one-dimensional interpolation. This needs to be done to ensure that all $D_n$ have borders with defined pixels.

We suggest that one actually copies a little more data for every $D_n$ (for instance by expanding the areas $D_1 \ldots D_N$ by a few pixels) and then blending them into one another with a soft transition (by using a Gaussian kernel on the copy mask) or by using the technique of "minimum error boundary" (as suggested by D. S. Wickramanayake and H. E. Bez and E. A. Edirisindhe, "*Multi Resolution Texture Synthesis in Wavelet Transform Domain.*").

Note that any technique of "minimum error boundary" will replace the straight vectors by more or less curved paths. Also, in a simpler approach, one may want to convert the straight path into a curved path, such as a sine curve, being less detectable to the eye of viewer.

The above described method has shown to produce superior results when large areas in an image containing structure need to be inpainted.

All features disclosed in the specification, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

This invention is not limited to particular hardware described herein, and any hardware presently existing or developed in the future that permits processing of digital images using the method disclosed can be used, including for example, a digital camera system.

A computer readable medium is provided having contents for causing a computer-based information handling system to perform the steps described herein.

The term memory block refers to any possible computer-related image storage structure known to those skilled in the art, including but not limited to RAM, processor cache, hard drive, or combinations of those, including dynamic memory structures. Preferably, the methods and application program interface disclosed will be embodied in a computer program (not shown) either by coding in a high level language.

Any currently existing or future developed computer readable medium suitable for storing data can be used to store the programs embodying the afore-described interface, methods and algorithms, including, but not limited to hard drives, floppy disks, digital tape, flash cards, compact discs, and DVD's. The computer readable medium can comprise more than one device, such as two linked hard drives. This invention is not limited to the particular hardware used herein, and any hardware presently existing or developed in the future that permits image processing can be used.

Any currently existing or future developed computer readable medium suitable for storing data can be used, including, but not limited to hard drives, floppy disks, digital tape, flash cards, compact discs, and DVD's. The computer readable medium can comprise more than one device, such as two linked hard drives, in communication with the processor

The invention claimed is:

1. A computer-implemented method comprising:
   identifying a plurality of areas adjoining borders of an image, wherein the plurality of areas are created by a misalignment of the borders of the image with respect to a horizontal axis and a vertical axis;
   finding a respective set of replacement image data corresponding to each area of the plurality of areas, wherein each respective set of replacement image data is obtained from a respective source region of the image or of a different image;
   adapting pixels of each respective set of replacement image data to visually fit the corresponding area of the plurality of areas; and
   after the adapting, producing an updated image by replacing each of the areas of the plurality of areas with the corresponding respective set of replacement image data.

2. The computer-implemented method of claim 1, further comprising modifying the image to cause the misalignment of the borders of the image with respect to the horizontal axis and the vertical axis.

3. The computer-implemented method of claim 2, wherein modifying the image includes rotating the image to cause the borders of the image to become misaligned with the horizontal axis and the vertical axis.

4. The computer-implemented method of claim 2, wherein modifying the image includes modifying pixels of the image to correct perspective distortion in the image caused by an image capture device that captured the image.

5. The computer-implemented method of claim 2, wherein modifying the image includes a modifying pixels of the image to correct distortion in the image caused by lens defects of an image capture device that captured the image.

6. The computer-implemented method of claim 1, further comprising determining margin pixels at a margin of the image, wherein the margin pixels have pixel values based on one or more pixels closest to the margin pixels, wherein each of the plurality of areas includes one or more of the margin pixels that form a border of the respective area.

7. The computer-implemented method of claim 1, wherein producing the updated image includes overwriting undefined pixels in the plurality of areas with the respective sets of replacement image data.

8. The computer-implemented method of claim 1, wherein adapting the pixels includes iteratively applying a kernel to particular pixels enclosed by border pixels determined by differences between pixel values of margins of the respective source region and the corresponding area.

9. The computer-implemented method of claim 1, wherein finding the respective set of replacement image data includes:
   dividing one or more areas of the plurality of areas into a plurality of sub-pieces along one or more cutting paths, each cutting path starting and ending at two respective points on a border of the one or more areas; and
   finding a respective subset of replacement image data corresponding to each respective sub-piece of the plurality of sub-pieces, wherein the respective subset of replacement image data is obtained from the respective source region of one of: the image or the different image.

10. The computer-implemented method of claim 9, wherein adapting pixels of each respective set of replacement image data includes adapting pixels of the respective subsets of replacement image data to visually fit the corresponding sub-pieces of the plurality of sub-pieces, and wherein producing the updated image includes replacing the respective sub-pieces of the image with the corresponding subsets of replacement image data.

11. The computer-implemented method of claim 9, wherein the adapting includes interpolating pixel values along the one or more cutting paths between a start point and an end point of each of the one or more cutting paths to determine one or more pixel values along the one or more cutting paths in the one or more areas.

12. The computer-implemented method of claim 9, further comprising expanding one or more of the sub-pieces to include additional pixels and blending colors of the additional pixels with pixels in the one or more of the sub-pieces.

13. A system comprising:
   a storage device; and
   at least one processor operative to access the storage device and configured to perform operations comprising:
   detecting a plurality of areas along borders of a rectangular image, wherein the plurality of areas are created by a misalignment of the borders of the rectangular image with respect to a horizontal axis and a vertical axis;
   finding a respective set of replacement image data corresponding to each area of the plurality of areas, wherein each respective set of replacement image data is obtained from a respective source region of the rectangular image or of a different image;

adapting pixels of each respective set of replacement image data to fit a corresponding area of the plurality of areas, wherein the adapting is based upon differences between pixel values of a margin of the respective source region and a margin of the corresponding area; and after the adapting, producing an updated image by replacing each of the areas of the plurality of areas with a corresponding respective set of replacement image data.

14. The system of claim 13 wherein the at least one processor is configured to perform further operations comprising modifying the rectangular image to cause the misalignment of the borders of the rectangular image with respect to the horizontal axis and the vertical axis.

15. The system of claim 14 wherein the operation of modifying the rectangular image includes rotating the rectangular image to causes the borders of the rectangular image to become misaligned with the horizontal axis and the vertical axis.

16. The system of claim 14 wherein the operation of modifying the rectangular image includes modifying pixels of the rectangular image to correct distortion in the rectangular image caused by an image capture device that captured the image.

17. The system of claim 13 wherein the operation of producing the updated image includes overwriting undefined pixels in the plurality of areas with the respective sets of replacement image data.

18. The system of claim 13 wherein the operation of finding the respective set of replacement image data includes:
dividing one or more areas of the plurality of areas into a plurality of sub-pieces along one or more cutting paths, the one or more cutting paths starting and ending at two respective points on a border of the one or more areas; and
finding a respective subset of replacement image data corresponding to each respective sub-piece of the plurality of sub-pieces, wherein the respective subset of replacement image data is obtained from the respective source region of one of: the rectangular image or the different image.

19. A non-transitory computer readable medium having stored thereon program instructions that, when executed by a processor, cause the processor to perform operations including:
modifying an image to cause misalignment of borders of the image with respect to a horizontal axis and a vertical axis;
identifying a plurality of border areas adjoining the borders of the image, wherein the plurality of border areas have pixels with undefined pixel values with respect to pixel values of the image, wherein the plurality of border areas are created by the misalignment of the borders of the image;
finding a respective set of replacement image data corresponding to each border area of the plurality of border areas, wherein each respective set of replacement image data is obtained from a respective source region of the image or of a different image;
adapting pixels of each respective set of replacement image data to visually fit the corresponding border area of the plurality of border areas; and
after the adapting, producing an updated image by replacing each of the border areas of the plurality of border areas with the corresponding respective set of replacement image data.

20. The non-transitory computer readable medium of claim 19 wherein modifying the image includes at least one of:
rotating the image to cause the borders of the image to become misaligned with the horizontal axis and the vertical axis; or
modifying pixels of the image to correct distortion in the image caused by an image capture device that captured the image.

* * * * *